United States Patent
Steelman et al.

(10) Patent No.: US 9,855,732 B2
(45) Date of Patent: *Jan. 2, 2018

(54) METHOD OF APPLYING ADHESIVE COATED FILM

(71) Applicant: 3M INNOVATIVE PROPERTIES COMPANY, St. Paul, MN (US)

(72) Inventors: Ronald S. Steelman, Woodbury, MN (US); John R. David, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/949,350

(22) Filed: Nov. 23, 2015

(65) Prior Publication Data
US 2016/0075120 A1    Mar. 17, 2016

Related U.S. Application Data

(63) Continuation of application No. 14/487,154, filed on Sep. 16, 2014, now Pat. No. 9,221,237, which is a
(Continued)

(51) Int. Cl.
*B32B 37/00* (2006.01)
*B32B 37/10* (2006.01)
(Continued)

(52) U.S. Cl.
CPC .......... *B32B 37/10* (2013.01); *B29C 63/0073* (2013.01); *B29C 63/02* (2013.01);
(Continued)

(58) Field of Classification Search
CPC ............ B29C 63/0078; B29C 63/0073; B29C 63/025; B29C 2063/006; B29C 2063/027;
(Continued)

(56) References Cited

U.S. PATENT DOCUMENTS 754,403 A    3/1904   Coe
1,672,093 A    6/1928   Sadtler
(Continued)

FOREIGN PATENT DOCUMENTS

AU    7110191    8/1991
DE    3732157    5/1989
(Continued)

OTHER PUBLICATIONS

Brady, H., "Ten Steps to Successful Vinyl Truck Lettering", *SignCraft Magazine*, 3 pages, Issue 74, Jan./Feb. 1994.
(Continued)

*Primary Examiner* — John Goff
(74) *Attorney, Agent, or Firm* — Emily M. Van Vliet; Steven A. Bern

(57) ABSTRACT

An adhesive-applying method is disclosed herein. The method comprises: providing a film comprising pressure sensitive adhesive coated on a major surface thereof; heating the film to a softening point of the film; and pressing the film against a substrate with an application device, the application device comprising a film-contacting portion, the film-contacting portion comprising a foam material and having a thermal conductivity of less than 1.8 BTU in/(hr ft$^{2\circ}$ F.); wherein the pressure sensitive adhesive on the major surface of the film adheres to the substrate. Application devices and kits that may be used in conjunction with the method are also disclosed herein.

12 Claims, 3 Drawing Sheets

Related U.S. Application Data continuation of application No. 14/073,135, filed on Nov. 6, 2013, now abandoned, which is a continuation of application No. 11/427,983, filed on Jun. 30, 2006, now Pat. No. 8,608,897, which is a continuation of application No. 09/479,648, filed on Jan. 7, 2000, now abandoned, which is a continuation-in-part of application No. 09/236,806, filed on Jan. 25, 1999, now abandoned.

(51) Int. Cl.

| | | |
|---|---|---|
| *B32B 37/12* | (2006.01) | |
| *B32B 37/06* | (2006.01) | |
| *B32B 27/30* | (2006.01) | |
| *B32B 7/12* | (2006.01) | |
| *B29C 63/00* | (2006.01) | |
| *B29C 63/02* | (2006.01) | |
| *G09F 15/02* | (2006.01) | |
| *G09F 7/12* | (2006.01) | |
| *C09J 5/06* | (2006.01) | |
| *C09J 7/02* | (2006.01) | |
| *B32B 37/04* | (2006.01) | |
| *B29C 65/48* | (2006.01) | |
| *B29C 65/00* | (2006.01) | |
| *B29L 31/10* | (2006.01) | |
| *B29C 65/10* | (2006.01) | |
| *B29C 65/14* | (2006.01) | |
| *B32B 38/04* | (2006.01) | |
| *B29C 65/60* | (2006.01) | |

(52) U.S. Cl.
CPC ............ *B32B 7/12* (2013.01); *B32B 27/30* (2013.01); *B32B 37/06* (2013.01); *B32B 37/12* (2013.01); *C09J 5/06* (2013.01); *C09J 7/0264* (2013.01); *G09F 7/12* (2013.01); *G09F 15/02* (2013.01); *B29C 65/10* (2013.01); *B29C 65/1412* (2013.01); *B29C 65/4825* (2013.01); *B29C 65/60* (2013.01); *B29C 66/1122* (2013.01); *B29C 66/472* (2013.01); *B29C 66/71* (2013.01); *B29C 66/7463* (2013.01); *B29C 66/81457* (2013.01); *B29C 66/8362* (2013.01); *B29C 66/8652* (2013.01); *B29C 66/919* (2013.01); *B29L 2031/102* (2013.01); *B32B 37/003* (2013.01); *B32B 37/0053* (2013.01); *B32B 37/04* (2013.01); *B32B 2038/047* (2013.01); *B32B 2255/24* (2013.01); *B32B 2307/748* (2013.01); *B32B 2309/02* (2013.01); *B32B 2310/0825* (2013.01); *B32B 2333/00* (2013.01); *B32B 2375/00* (2013.01); *B32B 2386/00* (2013.01); *B32B 2405/00* (2013.01); *B32B 2419/00* (2013.01); *B32B 2419/02* (2013.01); *B32B 2605/00* (2013.01); *B32B 2607/02* (2013.01); *C09J 2201/122* (2013.01); *C09J 2201/606* (2013.01); *C09J 2205/31* (2013.01); *C09J 2423/006* (2013.01); *C09J 2427/006* (2013.01); *C09J 2433/006* (2013.01); *C09J 2475/006* (2013.01)

(58) Field of Classification Search
CPC ... B29C 66/81457; B32B 37/06; B32B 37/10; B32B 37/053; B32B 37/0053; G09F 7/12; G09F 2007/127
See application file for complete search history.

(56) References Cited

U.S. PATENT DOCUMENTS

| | | |
|---|---|---|
| 1,887,847 A | 11/1932 | Peiper |
| 1,895,045 A | 1/1933 | Moore |
| 2,123,415 A | 7/1938 | Gorbatenko |
| 2,372,737 A | 4/1945 | Phillips, Jr. |
| 2,714,559 A | 8/1955 | Sheffield |
| 3,047,050 A | 6/1959 | Earl |
| 3,214,502 A | 10/1965 | Schaar |
| 3,300,355 A | 1/1967 | Adams |
| 3,853,669 A | 12/1974 | Werstlein |
| 3,861,988 A | 1/1975 | Preisler |
| 3,865,662 A * | 2/1975 | Segal ............... B29C 65/18 138/99 |
| 3,962,016 A | 6/1976 | Alfter |
| 4,061,519 A | 12/1977 | Hammer |
| 4,126,727 A | 11/1978 | Kaminski |
| 4,181,752 A | 1/1980 | Martens |
| 4,199,646 A | 4/1980 | Hori |
| 4,204,904 A | 5/1980 | Tabor |
| 4,212,691 A | 7/1980 | Potosky |
| 4,261,783 A | 4/1981 | Finke |
| 4,358,495 A | 11/1982 | Parker |
| 4,511,425 A | 4/1985 | Boyd |
| 4,545,843 A | 10/1985 | Bray |
| 4,737,213 A | 4/1988 | Paeglis |
| 4,751,121 A | 6/1988 | Kühnel |
| 4,806,194 A | 2/1989 | Wald |
| 4,867,816 A | 9/1989 | Suiter |
| 4,994,514 A | 2/1991 | Blackwell et al. |
| 5,019,295 A | 5/1991 | Yoshida |
| 5,034,077 A | 7/1991 | Pata |
| 5,174,852 A | 12/1992 | Zepf |
| 5,221,408 A | 6/1993 | Haider |
| 5,248,355 A | 9/1993 | Olsen |
| 5,268,215 A | 12/1993 | Krenceski |
| 5,284,689 A | 2/1994 | Laurash |
| 5,306,382 A | 4/1994 | Pichel |
| 5,346,571 A | 9/1994 | Condon |
| RE34,884 E | 3/1995 | Coleman |
| 5,445,704 A | 8/1995 | Dizon |
| 5,484,505 A | 1/1996 | Isakson |
| 5,611,881 A | 3/1997 | Kimura |
| 5,693,141 A | 12/1997 | Tramont |
| 5,741,542 A | 4/1998 | Williams |
| 5,800,919 A | 9/1998 | Peacock |
| 5,814,184 A | 9/1998 | Denkins |
| 5,824,415 A | 10/1998 | Kanki |
| 5,944,935 A | 8/1999 | Zukas |
| 5,971,034 A | 10/1999 | Heisey |
| 5,972,472 A | 10/1999 | Uschold |
| 5,976,690 A | 11/1999 | Williams |
| 6,110,316 A | 8/2000 | Kobayashi |
| 6,146,485 A | 11/2000 | Iacono |
| 6,172,698 B1 | 1/2001 | Iwata |
| 6,177,189 B1 | 1/2001 | Rawlings |
| 6,207,272 B1 | 3/2001 | Takahira |
| 6,221,198 B1 | 4/2001 | Gryska |
| 6,270,871 B1 | 8/2001 | Scholz |
| 6,331,355 B1 | 12/2001 | Tebbe |
| 6,379,444 B1 | 4/2002 | Adkins |
| 6,461,706 B1 | 10/2002 | Freedman |
| 6,474,389 B1 | 11/2002 | Steelman et al. |
| 6,520,234 B1 | 2/2003 | Anderson et al. |
| 6,536,498 B1 | 3/2003 | Srinviasan |
| 6,663,947 B2 | 12/2003 | Freedman |
| 6,664,359 B1 | 12/2003 | Kangas |
| 6,709,726 B1 | 3/2004 | Dronzek, Jr. |
| 6,808,658 B2 | 10/2004 | Stover |
| 6,824,638 B1 | 11/2004 | Anderson et al. |
| 8,608,897 B2 * | 12/2013 | Steelman ............ B29C 63/0073 156/309.9 |
| 9,221,237 B2 * | 12/2015 | Steelman ............ B29C 63/0073 |
| 2002/0092611 A1 | 7/2002 | Anderson et al. |
| 2002/0098348 A1 | 7/2002 | McReynolds |
| 2004/0191664 A1 | 9/2004 | Hosoi |
| 2006/0063673 A1 | 3/2006 | Hidetoshi |

(56) References Cited

U.S. PATENT DOCUMENTS

| | | |
|---|---|---|
| 2007/0000606 A1 | 1/2007 | Steelman |
| 2008/0000583 A1 | 1/2008 | Steelman |
| 2008/0264558 A1 | 10/2008 | Hayes |

FOREIGN PATENT DOCUMENTS

| | | |
|---|---|---|
| DE | 4232697 | 9/1992 |
| GB | 1135928 | 12/1968 |
| GB | 2250513 | 6/1992 |
| GB | 2289433 | 11/1995 |
| JP | S55005838 | 1/1980 |
| JP | S5648271 | 5/1981 |
| JP | 58-017129 | 2/1983 |
| JP | 58-045020 | 3/1983 |
| JP | S60159459 | 10/1985 |
| JP | 07-001590 | 1/1995 |
| JP | H08118575 | 5/1996 |
| JP | 10-252743 | 9/1998 |
| KR | 1019880701550 | 4/1989 |
| KR | 2019910002506 | 9/1992 |
| KR | 1019960044990 | 7/1998 |
| KR | 10-2003-0036639 | 5/2003 |
| WO | WO 1988002604 | 4/1988 |
| WO | WO 1992-017870 | 10/1992 |
| WO | WO 1994015779 | 7/1994 |
| WO | WO 1997-033947 | 9/1997 |
| WO | WO 1998021423 | 5/1998 |
| WO | WO 1998-029516 | 7/1998 |
| WO | WO 1999-020466 | 4/1999 |
| WO | WO 2000-043220 | 7/2000 |
| WO | WO 2008-002793 | 1/2008 |

OTHER PUBLICATIONS

Wharenbrock; "Thermal Conductivity on Material-Insulation-Thermal-Silicone Rubber Foam, Fiberglas Batting Composite, Epoxy Bonded Microbaloon", 1 page, Aug. 25, 1959.

U.S. Appl. No. 09/479,648, filed Jan. 7, 2000; "Method of Applying Adhesive Coated Film", now abandoned.

3M Hand Squeeze Roll Applicators, HSRA-48, HSRA-36, and HSRA-12, Information Folder 1.6, Oct. 1998 (7 pages).

3M Thermally-Conductive Adhesive Transfer Tapes, 9882, 9885, 9890, Technical Data, Apr. 1998 (6 pages).

Flach et al., A Thermal Model for Laminated Object Manufacturing (LOM) (12 pages).

Gilmore, "Iron-On Wall Patch", Popular Science, Feb. 1986 (1 page).

Ball III et al., Monsanto Research Corporation, "High Temperature Polyimide Foams for Shuttle Upper Surface Thermal Insulation", Dec. 1974 (88 pages).

Song et al., "Properties of Pressure-Sensitive Rubber Adhesive in a Heat Shrinkable Sheet for Protection of Welded Part of Gas Pipe Line", Journal of the Korean Institute of Gas, vol. 2, No. 3, Oct. 1998 (11 pages).

\* cited by examiner

METHOD OF APPLYING ADHESIVE COATED FILM

CROSS-REFERENCE TO RELATED APPLICATION

This application is a continuation of U.S. application Ser. No. 14/487,154, filed Sep. 16, 2014, now U.S. Pat. No. 9,221,237, which is a continuation of U.S. application Ser. No. 14/073,135, filed Nov. 6, 2013, which has been abandoned, which is a continuation of Ser. No. 11/427,983, filed Jun. 30, 2006, now U.S. Pat. No. 8,608,897, which is a continuation of U.S. application Ser. No. 09/479,648, filed Jan. 7, 2000, now abandoned, which is a continuation-in-part of U.S. application Ser. No. 09/236,806, filed Jan. 25, 1999, now abandoned, with disclosures of which are incorporated herein by reference.

FIELD OF INVENTION

This invention concerns articles and methods to save labor effort and improve quality of application in adhering adhesive-coated films to surfaces of substrates, especially those having irregular surfaces.

BACKGROUND

Today, adhesive-coated plastic films, especially vinyl films with pressure sensitive adhesives or pressure-activated adhesives, are applied to a variety of surfaces for a variety of reasons such as advertisement, decoration, protection, and the like. Many of those surfaces contain rivets and other protrusions or indentations, such as the side of a truck trailer. When the film is applied over and adhered to these irregular surfaces, the film is strained to bring the adhesive into contact with the irregular surface. Residual stress in the film at such irregular surface locations often exceeds the holding power of the adhesive resulting in the film lifting off the surface to which it was adhered, particularly where the surface is irregular such as around a rivet or rib reinforcing the side of a truck trailer.

Current techniques for application to irregular surfaces involve applying most of the film with a small, plastic squeegee leaving a small area around the protrusion or indentation. Completing the application involves treating rivets to minimize lifting by heating the film with a heat source, usually a hot air gun or a torch, after the film has been predominately adhered to the irregular substrate. The film is typically heated while it is bridging the area around each type of surface irregularity, which can be summarized to be either a protrusion or an indentation. The film is not touched with the current tools because it is very soft and somewhat sticky. If it is touched, it is usually damaged. Because of the low mass of the film and the high temperature of the heat source, heating rates are several hundred degrees Celsius per second. Similar cooling rates are also occurring. When the film is then pushed into place with a tool, typically a squeegee for a rib or a rivet brush for a rivet, it is only slightly above room temperature. This does offer and improvement over pressing the film without warming because the delayed crystallization time of the film makes the film more compliant. A rivet brush is usually a stiff brush, usually about 2.54 cm in diameter with 1.25 cm long bristles attached to a short wooden handle. If the film is too soft because of the heating when it is contacted with a circular motion using the rivet brush, the film is likely to be damaged. If the film is too cool, the stress is not eliminated adequately, lifting results eventually. In an attempt to relax the residual stress, the film is often heated after application, but the temperature to which the film can be raised is limited by the thermal conductivity of the metal surfaces underneath the film. It is therefore very difficult for one skilled in the art to assuredly adhere the adhesive-coated film to the irregular surface while the film is fully softened without also damaging the film structure or its appearance. If there is damage, the film is weakened at that location and diminishes the durability of the film. If there is an image graphic on that film, the image is distorted or destroyed at the damaged location. An aberration in an image, even if the image is as large as a mural on the side of truck trailer, is quite noticeable and unsatisfactory to the owner of the trailer, the marketer of a product shown in the mural on the trailer, and the graphic fabricator who has invested considerable labor and other effort to adhere the graphic film to the side of the trailer.

If the film lifts because of residual stress, the film could crack, peel back, or be damaged and otherwise not meet expectations for a surface that should have paint-like appearance.

SUMMARY

An adhesive-applying method is disclosed herein. The method comprises: providing a film comprising pressure sensitive adhesive coated on a major surface thereof; heating the film to a softening point of the film; and pressing the film against a substrate with an application device, the application device comprising a film-contacting portion, the film-contacting portion comprising a foam material and having a thermal conductivity of less than 1.8 BTU in/(hr ft$^{2\circ}$ F.); wherein the pressure sensitive adhesive on the major surface of the film adheres to the substrate. Application devices and kits that may be used in conjunction with the method are also disclosed herein.

A labor-saving method for adhering an adhesive-coated film to a substrate having a surface is also disclosed herein. The labor-saving method comprises: distributing the film described above to a party that has been taught to use the adhesive-applying method of described above; optionally permitting the party to print an image on the film; and permitting the party to use the adhesive-applying method of described above.

The methods, application devices, and kits disclosed herein may be used with little training so that less skilled employees and consumers can obtain properly adhered films on substrates.

DETAILED DESCRIPTION

Figure 1:
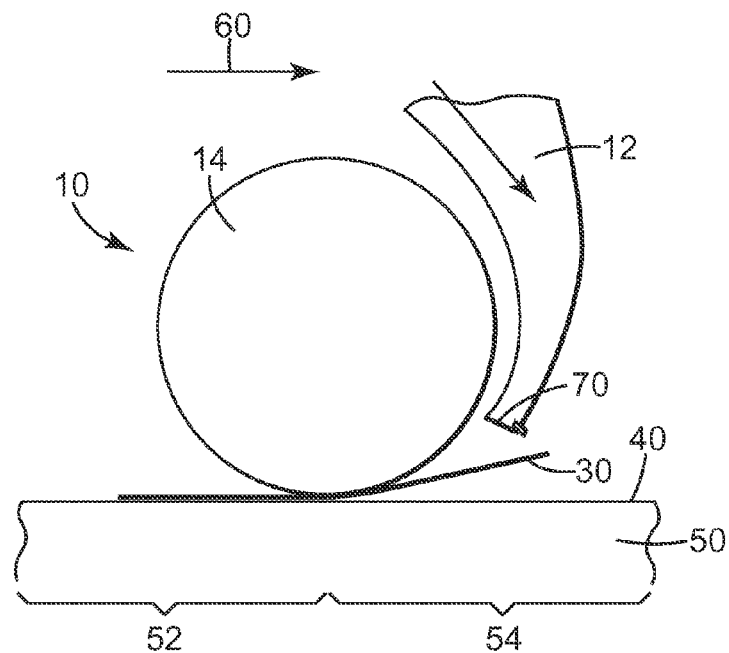
FIG. 1 illustrates application of a film to a substrate according using an exemplary application device.

The application devices, methods and kits have been described in U.S. application Ser. No. 09/479,648, filed Jan. 7, 2000, the disclosure of which is incorporated by reference for all that it contains.

Adhesion of adhesive-coated plastic films, particularly vinyl films, applied to flat and irregular surfaces is problematic with respect to appearance, durability, etc. As used herein, an "irregular surface" is a highly textured surface that does not allow complete conformance of an adhesive coated film to its surface due to the presence of protrusions, indentations or other such non-planar geometries. For example, an irregular surface may be sufficiently non-uniform such that a 4 mil film when applied thereto with a 4 kg rolling weight, makes contact with the surface at less than 90% of its surface area.

Because a film is usually stretched during application, especially to accommodate an irregular surface, the pressure sensitive adhesive must hold the film to the surface under various stresses. Previously, only films with high performance adhesives have been used in such an application with success. Some of the most common challenging surfaces include corrugated and riveted truck sides, curved vehicle panels, channels in containers and vehicles, etc.

Surprisingly, excellent adhesion of thermoplastic films to highly irregular or textured surfaces, such as concrete, cement block, stucco, brick, fabric surfaces, carpeted surfaces and the like, may be obtained with the adhesive-applying method described herein. Films applied to such surfaces without the adhesive-applying method described herein have significant portions that are not in contact with the surface of the substrate, particularly on the edges of the film. Films applied to such surfaces using the adhesive-applying method described herein have the appearance of being painted on the surface, due to the close conformance of the film to the substrate. Further, the edges of the film are advantageously in close conformance to the substrate, thereby reducing the temptation of passersby to peel away the film.

As will be readily understood by anyone who has attempted to hang wallpaper, the application of an adhesive-coated film to a vertical surface is very cumbersome and time-consuming. Application of such materials to challenging surfaces such as truck trailers is that much more difficult. At the least, the wall is usually even and does not contain compound geometrical or irregular surfaces. Typically, the size of a wallpaper section is about 70 cm wide and about 2.5 m long. The application of an adhesive-coated film to a vertical side of a truck trailer occurs in a vastly different environment: a substrate that is often filled with topographical irregularities and film sections having a size of about 120 cm wide and about 3 m long. Very skilled persons are needed for this assembly, and such assembly takes very long times: on the order of 22 hours per truck trailer.

Typical methods require individual treatment of each rivet area, including first punching holes in the film to allow air to escape, applying heat to the film to somewhat soften the film, and finally applying pressure using a brush to press the film down on the substrate using a circular motion and firm pressure. Because of the pressure and motion required in this application, the film could not be very soft at the time of brushing the film into place. The film had to be allowed to cool to a temperature at which the structural integrity of the film could withstand the forces imparted on it by the brush. Damage to the film and/or poor placement of the film over the rivet areas often occurred. In contrast, the adhesive-applying method disclosed herein allows single stroke application of the film to the substrate on each rivet without concern over tearing or otherwise damaging the film through the swirling application of force through the rivet brush. This difference in application technique may reduce application time of applying a film to a truck trailer related to finishing the rivets of about 50%.

The adhesive-applying method described herein may provide a labor savings for the application of an image graphic film to a large vertical substrate having compound geometrical or irregular surfaces. As a result, overall total cost may be substantially reduced. Even with the cost of film remaining constant, the labor savings reduces as much as 50 percent total cost for the application of a non-printed film to a corrugated and riveted trailer.

The adhesive-applying method described herein makes it possible to adhere films to trailers and other challenging environment areas using adhesives that are much less aggressive than was previously used. This is a significant advantage, because the end user may now more easily remove the films with removal costs being substantially reduced, on the order of 50%. Removable and/or repositionable adhesives may now much more readily be used.

It is virtually impossible to fully soften the film such that all residual stresses are removed and still apply the film using conventional tools without damaging the films. Furthermore, lack of control of the heating process and very rapid cooling of the film after heating usually cause inconsistent results even with high performance adhesives and skilled applicators.

The use of films with removable adhesives is very desirable in the short term advertising market, i.e., displays of less than about 12 months. Films having removable adhesives are predominantly used on flat surfaces because the adhesives do not adequately resist the residual stress remaining after application to non-flat surfaces using prior art techniques. Much higher heat is required to fully relax the film than can be applied using only the standard squeegee and rivet brush.

The adhesive-applying method disclosed herein provides for the application of heat and pressure at a location on a large flat surface during adhesion in such a manner that minute stresses in a film being adhered to the flat surface are removed prior to adhesion. The adhesive-applying method disclosed herein also provides for the application of heat and pressure to a location of surface irregularity on the substrate in a time-space manner that provides thermal and mechanical alteration of the film at the location of surface irregularity or compound geometry and in a manner that the pressure source is heat neutral.

The adhesive-applying method disclosed herein may be used for applying an adhesive-coated film to a substrate, the adhesive-applying method comprising: providing a film comprising pressure sensitive adhesive coated on a major surface thereof; heating the film to a softening point of the film; and pressing the film against a substrate with an application device, the application device comprising a film-contacting portion, the film-contacting portion comprising a foam material and having a thermal conductivity of less than 1.8 BTU in/(hr ft$^{2\circ}$ F.); wherein the pressure sensitive adhesive on the major surface of the film adheres to the substrate.

The adhesive-applying method disclosed herein employs an application device comprising a film-contacting portion, the film-contacting portion comprising a foam material and having a thermal conductivity of less than 1.8 BTU in/(hr ft$^{2\circ}$ F.). The application device may be described as a pressure source. In general, the film-contacting portion has thermal conductivity characteristics and surface characteristics such that when the film is in contact therewith, it does not adhere thereto, even when the film is nearly melted.

With respect to the thermal conductivity characteristics, the film-contacting portion does not appreciably conduct heat either to or from the surface of the film as the film is applied under pressure to a surface on the substrate. In other words, the thermal conductivity of the film-contacting portion is low but can withstand high temperatures. Desirably, the thermal conductivity is less than 1.8 BTU in/(hr ft$^{2o}$ F.) with thermal conductivity measured according to ASTM C-518.

The film-contacting portion comprises a foam material. The particular foam material used may be determined quickly and routinely by applying the adhesive-coated film to the substrate, heating the non-contacting portion of the film to nearly its melting point, and then immediately using the foam material to press the film to the substrate in an essentially perpendicular manner (without applying rotational force). If the film sticks to the foam material or is damaged by the foam material, then it is not suitable for use. Thus, in general, the film-contacting portion has a low enough surface energy relative to that of the softened film. Examples of suitable foam materials include materials known in the low adhesion backsize art, such as open cell foam materials and foamed silicone materials. Perfluorinated materials may also be used.

The foam material may be compressive to allow full contact of the film with the substrate, for example, in cases where the substrate has one or more protruding rivets. In general, it is desirable for the film to conform around protrusions such that full conformation or compliance of the film around any surface irregularity of the substrate may be obtained depending on the intended application. Preferably, the foam material has a Poisson's ratio of less than 1, and more preferably less than 0.9. In some cases, it may be desirable for the foam material to have a uniform surface structure such that when placed on a molten film, the film will not exhibit visible structure imprinted from the foam material. The application device may comprise a hand-held dauber type device that can provide a localized pressure around particular irregularities in the substrate surfaces. Preferably, the surface area of the dauber is somewhat larger than the area of a rivet that would conventionally appear on a truck. For example, the application device may have a pressure-imparting surface of about 7 cm diameter.

The film-contacting portion may be in the form of a roller, much like a paint roller. The width of the roller depends on the application, for example, for applying film to a corregated surface or a surface with rivets, a roller width of 2-15 cm is generally preferred. The application device may be designed to impart essentially perpendicular force with respect to the substrate with little or no transverse force to the film during application.

In the adhesive-applying method described herein, the film to be applied to the substrate is heated to a softening temperature of the film, such that the film is highly flexible and soft as compared to the film's properties at room temperature. The softening temperature of the film may be nearly the melting temperature of the film—just below the temperature at which the film would discolor or develop holes.

The adhesive-applying method described herein comprises heating the film to a softening point of the film. Heating may comprise heating the film using hot air, or by using infrared radiation. Heating may comprise heating the entire film or heating a selected portion of the film. In addition, heating may be carried out before or after the film is applied to the substrate. In one example, the entire film could be heated and applied at the same time. In another example, heating may be carried out while the film is in contact with the film-contacting portion before pressing the film against the substrate: the film could be applied to an irregular surface without heating, maximizing the contact of the film to the substrate, and leaving portions of the film not in contact with the substrate, but which are "tented" between adhesively contacting portions. Those portions of the film that are not in contact with the substrate are then heated to a softening point of the film, and applied to the substrate by pressing. In this case, the application device would be used to actually move the softened film into contact with the substrate. Surprisingly, the film fully conforms to the surface without damage to the film.

The heat source and the film-contacting portion may be separate or the same within the application device. For example, the method may comprise a two-person operation, wherein one person operates the heat source and a second person quickly follows with the film-contacting portion. For another example, one person may carry out the method by using a hand-held heat source (much like a hair dryer) in one hand, and a hand held film-contacting portion (much like a dauber) in the other hand. The method thus may proceed in a rhythmic motion of first applying heat with one hand, and immediately applying pressure with the other, down a row of rivets or the like.

In the method of the present invention, it is often desirable to first provide air holes in the film immediately surrounding the surface irregularity at the portion where the film is not in contact with the substrate prior to heating the film. Such air holes provide an escape route for air that is trapped between the film and the substrate. In most cases, it is desirable for the film-contacting portion to allow air to escape during application of pressure to the film.

In some cases, it may be desirable for the film-contacting portion to be smooth enough so that markings are not imprinted onto the softened film. The foam material generally comprises cells, and in this case, the cells may need to be not so large as to imprint the cell pattern onto the softened film. The cells may be no larger than about 0.5 mm in diameter, for example, no larger than 0.2 mm.

Any adhesive-coated film may be used. In general, the film comprises a film having a pressure sensitive adhesive coated on a major surface thereof. The pressure sensitive adhesive may or may not be a heat-activated adhesive. The pressure sensitive adhesive may also be a removable and/or repositionable adhesive, for example, Scotchcal™ Series 3500 films available from 3M Company. As used herein, an adhesive is considered to be "removable" if, upon application to an intended substrate the product ca be removed without damage to the substrate at the end of its intended life at a rate in excess of 25 feet/hour (7.62 meters/hour) by hand with the optional use of heat.

The film may comprise any of a variety of films including elastic films that normally would be unsuitable for graphic applications, especially on irregular surfaces. Such films would ordinarily exhibit significant memory upon application to uneven substrates, however, with the method disclosed herein, they can be thermally relaxed during application to remove residual stress. Useful films include vinyl films, polyolefin films, unoriented polyolefin films, polyurethane films, ionomeric resin films, acrylic films, fluoroelastomeric films, and the like.

Further, the film may be a rigid film that exhibits good handleability and durability, because such films are now capable of being softened at the time of application to conform to irregular or compound curve surfaces. Examples of rigid films are poly(meth)acrylates films, rigid polyvinyl chloride sheets, polyester films, oriented polyolefin films, polycarbonate sheets, styrene sheets, and the like.

A particular example of a useful film is presently sold by 3M Company of St. Paul, Minn., USA under the brands of Scotchcal™; Controltac™ and the like. Examples using these films are described below.

Also disclosed herein is a kit for application of films to a substrate, the kit comprising: an application device comprising a film-contacting portion, the film-contacting portion comprising a foam material and having a thermal conductivity of less than 1.8 BTU in/(hr ft$^{2\circ}$ F.); and a heat source adapted for applying heat to an adhesive coated film during application of the adhesive coated film to a substrate.

Also disclosed herein is a labor-saving method for adhering an adhesive-coated film to a substrate having a surface, the labor-saving method comprising: distributing the film described above to a party that has been taught to use the adhesive-applying method described above; optionally permitting the party to print an image on the film; and permitting the party to use the adhesive-applying method described above.

An entirely new business method can be created using the application devices and methods described herein. The business method comprises contracting with an owner of an image to make that image on a graphic marking film, wherein the maker of the graphic marking film prints the image and assembles the image graphic film onto a substrate using the application devices and methods disclosed herein. Alternatively, the film maker can subcontract the use of the application devices and methods to permit remote subcontractor(s) to assemble the graphic film(s) on the substrate(s) for further distribution or usage. The image may be distributed to multiple remote locations and printed and assembled using the same techniques at all locations, all benefiting from the labor savings afforded by the application devices and methods described herein.

FIG. 1 illustrates application of a film to a substrate using an exemplary application device. Application device 10 contains a heat source 12 and a pressure source 14 wherein the pressure source is constructed of a heat neutral material. A film 30 is applied to a surface 40 of a substrate 50, having a location 52 where film 30 is adhered and a location 54 where film 30 has not yet been applied. Application device 10 moves in a direction 60. Heat source 12 can have a nozzle 70 for directing heat toward the film 30 at the location 54 before film 30 is contacted by pressure source 14 in the form of a roller that is constructed of a material that conforms to any surface irregularities or compound geometrical locations on surface 40 of substrate 50. The film 30 at location 54 receives an intersection of heat and pressure but not combined heat and pressure within the pressure source 14. Thus, the film 30 is heated before contacting the surface 40, but any dissipation of heat occurs through the substrate 50 not the pressure source 14. In this manner, unexpectedly, the intersection of heat and pressure for the film 30 does not harm the structure of the film 30 or mar its surface that can contain an image graphic.

Figure 2:
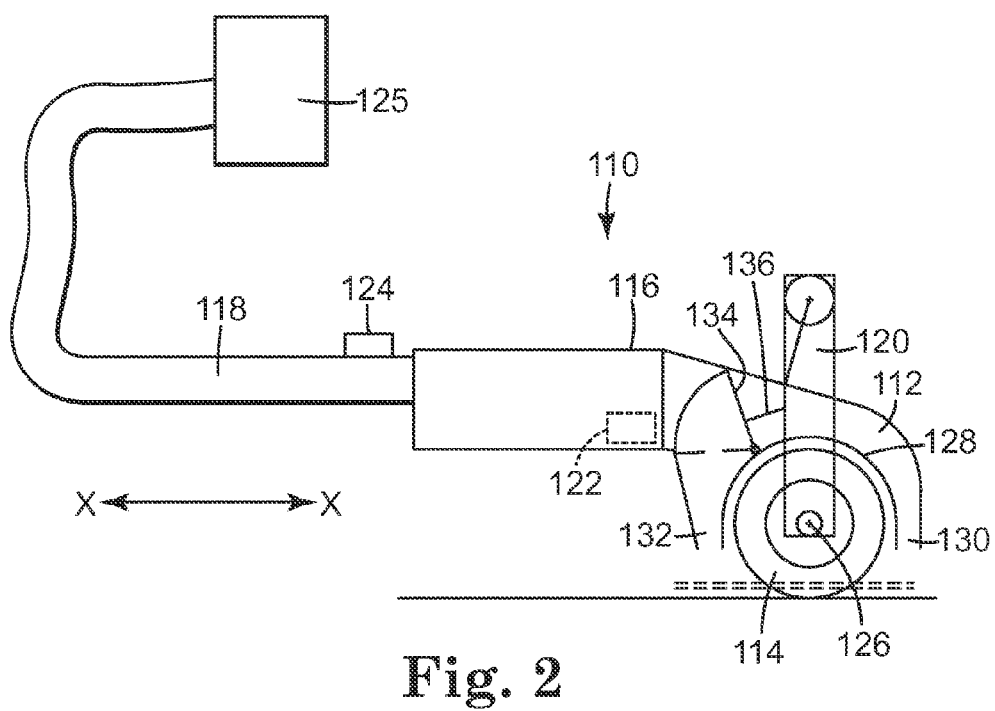
FIG. 2 is a perspective view of a second embodiment of the article of the present invention.

FIG. 2 illustrates application of a film to a substrate using an exemplary application device. Application device 110 for a substrate (e.g., utility vehicle such as a truck trailer or delivery van) that by design has surface irregularities of rivets and/or curves at corrugations, where the application device 110 has a heat source 112 and a surface-conforming pressure source 114 connected by a frame 116 with a first handle 118. Optionally, but preferably, the application device 110 also has a second handle 120 for guiding the application device 110, a temperature sensor 122 for measuring the temperature of the heat source 112, a temperature controller 124 for controlling and optionally displaying the temperature measured by the sensor 122. The frame 116 should provide sturdy but lightweight support for the other elements of the application device 110 and can be constructed from materials such as lightweight metal or rigid polymer.

The heat source 112 can be any heat source that is capable of generating temperatures such that the film is maintained at a softening point for the film until pressed against the irregular or compound surface by the pressure source 114. At that temperature, the film is softened and exhibits little or no tendency to recover making the film conformable for adhesion to the irregular surface or compound surface. Preferably, the temperature ranges from about 150° C. to about 350° C., depending on the composition of the film to be softened. Nonlimiting examples of such heat sources include heat guns generating hot air; quartz heaters generating infrared radiation; propane; and the like. The power for such heat source 112 can be connected to the frame 116 or remote from the frame 116, either an electrical or fuel heat element with a fan or compressed air source. Preferably, the heat source 112 is an electrical heating element of at least 300 Watts of power with a temperature sensor 122 and temperature controller 124. As seen in FIG. 2, a source of air to be heated by heat source 112 can be a remote air blower 125 connected to frame 116.

Application device 110 has a pressure source 114 that has a compliant surface that has low thermal conductivity. Generally, the pressure source 114 is a surface used to press the film into position, should match the irregularity of the substrate surface, and should retain the heat from heat source 112 until the film is brought into contact with the substrate surface. In the embodiment of FIG. 2, a roller 114 is used that rotates on an axle 126 mounted on the frame 116. Nonlimiting examples that have both a compliant surface and low thermal conductivity include natural or synthetic rubber; urethane polymers; silicone polymers (such as Rogers 800 Poron™ silicone foam, ½ inch thick); fluoroelastomers; and especially foamed version of those materials; and the like.

The use of application device 110 is enhanced from the positioning of a second handle 120 on the frame 116 along an axis near the point where the heat source 112 and pressure source 114 intersect on the film adhered to the substrate. This forward position for second handle 120, along with first handle 118 trailing the point where the heat source 112 and the pressure source 114 intersect, create an axis X-X of application for application device 110 along the substrate. This axis X-X helps a person guide the application device 110 for labor-saving, single-pass use of the application device 110.

Application device 110 is constructed to deliver heat around a deflector 128 to either nozzle 130 or nozzle 132. The direction of heat is distributed by a baffle 134 with a movable wing that impedes the flow of heated air to either nozzle 130 or nozzle 132. The baffle 134 is controlled by a linkage 136 to handle 120 that can pivot forward or backward along axis X-X. Thus, with minor motion, a person using application device 110 can shift handle 120 to control the direction of heat reaching the film. That control of direction permits the application device 110 to be used in both directions along axis X-X because it is a feature of the invention to heat the film before adhering it with pressure to the substrate.

Figure 3:
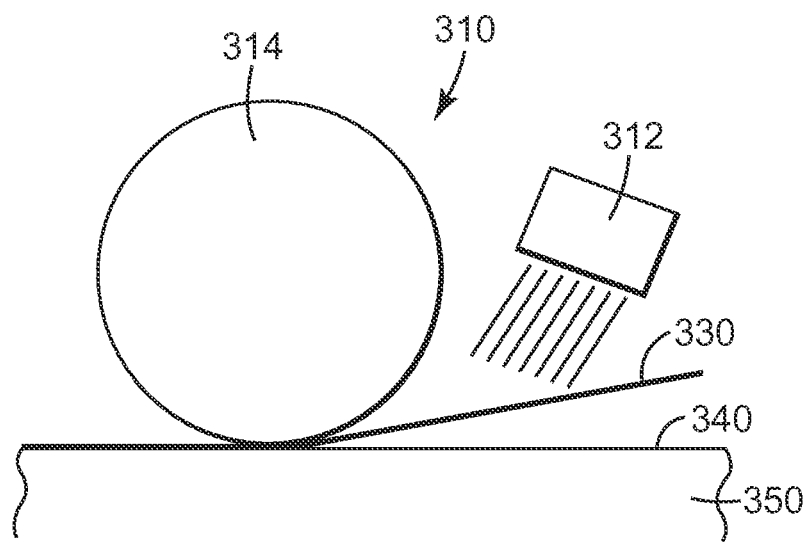
FIG. 3 is a perspective view of a third embodiment of the article of the present invention.

FIG. 3 illustrates application of a film to a substrate using an exemplary application device. Application device 310 has a heat source 312 and a pressure source 314 to apply film 330 to surface 340 of substrate 350. Heat source 312 supplies heat to film 330 in the form of radiation such as infrared rays. In this manner, convection is not used to transport heat to the film as was used in the embodiments shown in FIGS. 1 and 2.

Figure 4:
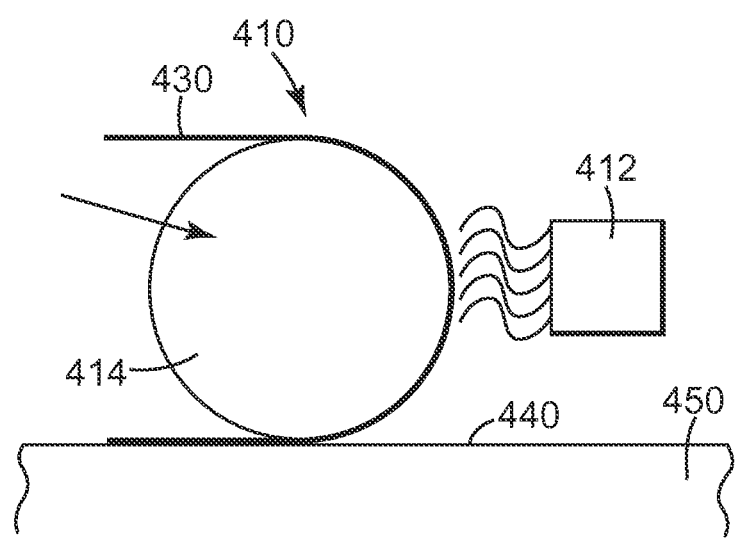
FIG. 4 is an illustration of another embodiment of the article of the present invention.

FIG. 4 illustrates application of a film to a substrate using an exemplary application device. FIG. 4 shows another embodiment to that seen in FIGS. 1 and 3. Application device 410 has a heat source 412 and a pressure source 414, but heat source 412 directs heat toward a film 430 rotating on pressure source 414 before application of the film 430 to a surface 440 on a substrate 450. This embodiment demonstrates that the location of heating of film can occur on the pressure source as the pressure source is delivering the film to the substrate.

Figure 5:
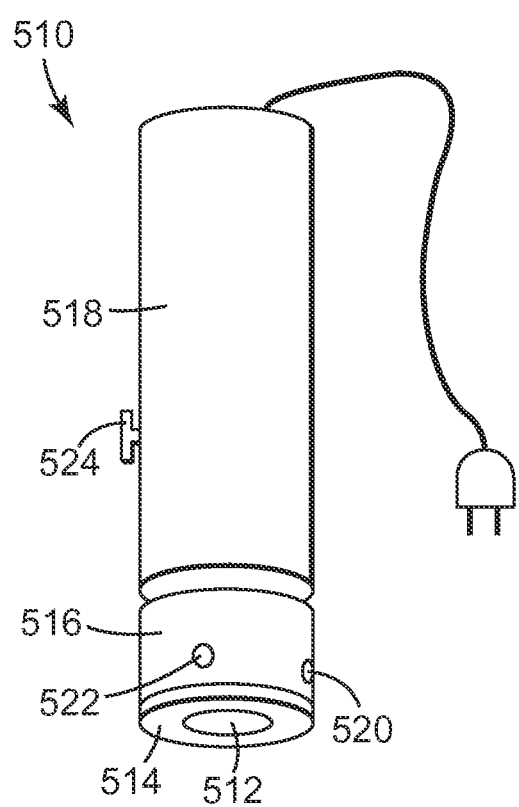
FIG. 5 is an illustration of another embodiment of the article of the present invention.

FIG. 5 illustrates application of a film to a substrate using an exemplary application device. FIG. 5 shows an embodiment for a different type of surface irregularity or compound surface on an image graphic substrate surface: a rivet used to join the surface to a reinforcement on the opposing surface of the substrate. Rivets proliferate on a truck trailer or delivery van and are very time-consuming to assure film adhesion thereto. In this embodiment, application device 510 has a heat source 512 and a pressure source 514, where the pressure source 514 is annular about the heat source 512. The annular pressure source 514 is sized to accommodate the raised, compound-curved surface of the rivet. Source 514 can be altered to accommodate any other irregular surface shape such as channels, grooves, depressions and other protrusions and indentation. Concentrically within or without the annular pressure source 514 is the heat source 512, such that the film contacting the raised, compound-curved surface of the rivet or the film surrounding the entire rivet, or both, can be heated concurrently with the application of the pressure source 514. Both the heat source 512 and the pressure source 514 are mounted on a frame 516 that has a handle 518. Frame 516 also contains an exhaust port 520 that permits air to escape from the heat source after the annulus of the pressure source 514 has contacted the surface of the substrate about the rivet.

The materials used for heat source 512, pressure source 514, and frame 516 can be the same as the materials used for heat source 112, pressure source 114, and frame 116 seen in FIG. 2. Optionally, application device 510 can also have a temperature sensor 522 and a temperature controller gauge 524 in locations as seen in FIG. 5 for the same purpose as described above with respect to the embodiment seen in FIG. 2.

Because heating and cooling rates of a typical image graphic film are several hundred degrees per second, the films very often cool to near room temperature before the forming/application can be completed when the conventional assembly technique is used. Films applied when the film is not suitably softened exhibit stress that can cause the adhesive bond to fail. Failure causes the film to lift off the surface, which results in poor appearance and film loss. Lifting failures decrease as pressured applications are made that approach the melting point of the film being applied.

Any of application devices 10, 110, 310, 410 or 510 permit one skilled in the art to apply film at or near its melting point without damaging the film. The use of a heat source and a pressure source intersecting concurrently at irregular or compound surface location(s) where film is under stress unexpectedly minimizes damage to the film. While the film is hot, it is pressed into position using a roller 14, 114, 314, 414 or annular ring 514 that does not dissipate the heat. When the hot film contacts the receptor surface, it is immediately quenched. This process reduces residual stress in the film to a level that can be overcome by many adhesives, including those that are considered low performance or removable.

It has been found that an adhesive-coated film, namely Controltac™ 180 film, can be successfully adhered using the application devices. The air temperatures range from about 200° C. to about 400° C., but the actual film temperature is best raised to 170 to 200° C. It has also been found that use of conventional heat sources that are separated in time and location from pressure sources can generate the necessary temperatures, but use of the rivet brush requires the film to cool to approximately 100° C., which is insufficient to permanently re-form the film about the surface irregularity of the substrate.

Controltac™ 180 film, comprising an adhesive disclosed in PCT Patent Publication WO 98/29516, was applied to white painted corrugated metal panels containing numerous rivets to simulate the outer surface of a truck trailer. The film liner was removed and the film was laid across the tops of the corrugations with light pressure applied to provide initial adhesion. An application device resembling the illustration seen in FIG. 2 was then rolled down into the valleys between corrugations where the pressure source had a soft urethane foam roller while applying heat at various temperatures. The temperatures were recorded as displayed on a Steinel heat gun commercially available from McMaster Carr. The panels with the adhered films were then placed in an aging oven for 6 days and heated to 79° C. The panels were then removed from the oven and left untouched for three weeks before measuring the natural lifting of film from around the rivets. The results are seen in Table 1 as follows.

TABLE 1

| Application Temp (° C.) | Average Lifting at Rivets (cm) |
| --- | --- |
| 65 | 0.396 |
| 93 | 0.277 |
| 121 | 0.317 |
| 149 | 0.317 |
| 177 | 0.256 |
| 204 | 0.119 |
| 232 | 0.119 |
| 260 | 0.109 |
| 288 | 0.045 |

These results show that hot air temperatures above 200° C. for vinyl films significantly reduces natural lifting of the film around rivets. The film is conformable to the surface irregularity or the compound curve of the surface to achieve durable adhesion of the film to the substrate.

It has also been found that as much as 80% of the time normally required for adhering a film on a corrugated and riveted substrate can be saved, reducing the total cost of adhering such film by as much as 50%.

What is claimed is:

1. A method of applying a film having a pressure sensitive adhesive on a major side thereof to a concrete, cement block, stucco, or brick substrate having an irregular surface, the method comprising:

heating a portion of the film with a heat source adapted to apply air heated to about 200° C. to about 400° C. to the portion of the film until the portion of the film softens, to form a heated portion of the film;

pressing the heated portion of the film against the substrate with an application device, the application device comprising a film-contacting portion comprising an open cell foam material having a uniform surface structure and a thermal conductivity of less than 1.8 BTU in/(hr ft$^{2\circ}$ F.); and wherein the pressure sensitive adhesive on the major surface of the film associated with said pressing adheres to the irregular surface of the substrate in a single pressing.

2. The method of claim 1, wherein the heating occurs before pressing the heated portion of the film against the substrate.

3. The method of claim 1, wherein the heating occurs while the portion of the film is in contact with the film-contacting portion before pressing the film against the substrate.

4. The method of claim 1, wherein heating the portion of the film to the softening point of the film comprises heating a selected portion of the film.

5. The method of claim 1, wherein the open cell foam material comprises cells that are no larger than about 0.5 mm in diameter.

6. The method of claim 1, wherein the film-contacting portion is in the form of a roller.

7. The method of claim 1, wherein the film comprises a vinyl film, polyolefin film, unoriented polyolefin films, polyurethane film, ionomeric resin film, acrylic film, or a fluoroelastomeric film.

8. The method of claim 1, wherein the substrate comprises a highly textured surface.

9. The method of claim 1, wherein the film comprises a rigid film.

10. The method of claim 1, further comprising:
before the heating and pressing steps, tenting the film against the substrate.

11. The method of claim 1, wherein the heated portion of the film that has been pressed against the substrate closely conforms to the substrate.

12. The method of claim 1, further comprising:
repeating the pressing step.

* * * * *